United States Patent Office 3,677,800
Patented July 18, 1972

3,677,800
ANTI-THROMBOGENIC COATINGS AND PRODUCTS
Archibald N. Wright, Schenectady, N.Y., assignor to General Electric Company
No Drawing. Filed Mar. 18, 1970, Ser. No. 20,816
Int. Cl. B44d 1/50
U.S. Cl. 117—93.31                                     6 Claims

ABSTRACT OF THE DISCLOSURE

A thin, continuous adherent coating is formed on a substrate by ultraviolet surface photopolymerization of sodium heparin in the gaseous phase. The resulting coated article exhibits anti-thrombogenic behavior and is suitable for prosthetic use.

---

This invention relates to the art of providing coatings of natural materials which have anti-thrombogenic properties. In one particular aspect, the present invention is directed to a single step deposition of an adherent coating of a photopolymerized natural material on a substrate to produce an anti-thrombogenic article.

Blood normally clots whenever it touches a foreign surface. With the increasing use of prosthetic articles and blood transporting equipment, there is now a wide search for suitable materials with which blood can be contacted without having undesirable effects on the blood or the prosthetic material itself. Conventional plastics and resins, including highly inert materials such as silicones, are not suitable for long term contact with blood because they are too thrombogenic, that is they promote deposition of platelets and thus the formation of blood clots. Numerous treatments to modify the surfaces of various plastics have been carried out to inhibit coagulation of blood or other undesirable phenomena but none of the treated materials has functioned satisfactorily due largely to thrombus formation on their surfaces. A thrombus is a fibrinous clot formed in thrombosis.

The prior art has attempted to coat plastics chemically from heparin, which is a powerful anticoagulant, but it has required highly complex techniques. For example, using polystyrene as a substrate, one method includes chloromethylation of the polystyrene surface with chloromethyl ether and aluminum chloride, reacting the resulting chloromethyl surface groups with tertiaryamine to give quaternary ammonium sites and bonding the sites to the sulfate groups of heparin. Since the number of bonding sites determine the extent to which heparin will be present at the plastic surface, such chemical methods do not result in a continuous coating of heparin being formed.

The prior art has also attempted to graft heparin onto the surface of a polymer by means of ionizing radiation. Such severe treatment, however, results in excessive decomposition of the heparin with a possible corresponding loss of its biological properties.

It is an object of the present invention to provide adherent, continuous coatings from anti-thrombogenic natural materials which retain a significant portion of the biological properties of the initial materials.

It is another object of this invention to provide such coatings through a process which is easy and economical to carry out and which consistently produces coatings of good quality.

Briefly stated, the process of the present invention comprises providing a natural material in the form of a vapor in the presence of a substrate. The vapor is subjected to ultraviolet light so that the substrate is coated by surface photopolymerization.

Anti-thrombogenic natural substances or materials are used to form the polymer coatings of the present invention. It is believed that since ultraviolet light is used in the instant process, which is light of extremely short wave length, the resulting coatings retain a significant portion of the biological properties of the initial substances from which they are formed. The coatings, therefore, should be more compatible with the body than synthetic materials. Representative of these materials are the polysaccharides such as, for example, heparin, or naturally occurring proteins such as hemoglobin and their amino acid components such as, for example, glycine, alanine and valine.

Specifically, sodium heparin is the sodium salt of a complex organic acid present in human tissues. It is generally derived from animal livers or lungs. Heparin appears to be a dextrorotatory polysaccharide built up from hexosamine and hexuronic acid units containing sulfuric acid ester groups. Sodium heparin is a powerful anticoagulant. It is a white or pale colored amorphous powder which is substantially odorless. It is hygroscopic and soluble in water but insoluble in solvents such as alcohol, acetone and benzene.

The anti-thrombogenic natural material used in the present invention is provided in the form of a vapor in the presence of a substrate in the reactor. The vapor pressure of the material in the reactor may vary. It should be sufficiently high to deposit a continuous coating on the substrate. It should not be so high, however, as to cause a gas phase reaction rather than a surface photopolymerization. Generally, to avoid a gas phase reaction, the maximum pressure of the vapor in the reactor should be less than about 10 torr and preferably less than about 2 torr. The particular vapor pressure used generally depends on the particular natural substance used.

Ultraviolet light from any source and of any type can be used. Suitable light sources include carbon arcs, high pressure mercury vapor lamps, fluorescent lamps, argon glow lamps, and photographic flood lamps.

The ultraviolet light source need only furnish an effective amount of light of the required wave length for a particular vapor. This is determinable empirically. In the present invention, the useful ultraviolet wave length generally ranges from about 1800 A. to about 4000 A. A majority of commercially available ultraviolet lamps usually emit effective amounts of light in this range as, for example, a 700 watt Hanovia lamp.

The present process can be carred out in a number of different types of enclosures or reactors. The reactor, however, should be gas-tight to insure sufficient buildup of vapor pressure therein to achieve a continuous polymerized film.

In carrying out the present process, the substrate to be coated is placed within the reactor so that the substrate surface to be coated receives the light emitted by the ultraviolet lamp. The rate at which the coating is formed is proprotional to the intensity of the light as well as the vapor pressure of the material within the reactor at less than two torr. In some instances, when desirable, the substrate may be cooled by conventional means such as a copper block provided with cooling means to promote formation of the coating.

The present coating can be formed on a wide variety of substrates of various forms of solid, porous, and woven materials, and of varying compositions including metals and non-metals to form the coated article of this invention. Typical substrate forms include sheets, tubes, and fibers. Representative metallic substrates useful as prosthetic forms or medical inserts are stainless steel and aluminum. Examples of nonmetallic substrates useful as prosthetic forms include polytetrafluoroethylene sold under the trademark Teflon and polyethylene terepthalate sold under the trademark Dacron.

The coatings produced by the present invention are adherent, continuous and substantially uniform in thickness. The present thin coatings are particularly useful to maintain the geometry of machined parts such as heart valves as well as to impart anti-thrombogenic properties to these parts. If desired, a mask may be used to cover certain portions of the substrate surface to be coated to produce a coating having a predetermined pattern. The mask can be formed of a conventional material such as stainless steel.

The coated articles of the present invention exhibit anti-thrombogenic behavior. They are particularly useful as prosthetic materials and in blood transporting equipment.

The invention is further illustrated by the following examples.

EXAMPLE 1

In this example a number of different types of substrates were coated by the process of the present invention.

The substrates used were as follows:
Aluminum foil 1 inch wide and 3 inches long.
Glass microscope slide, 1 inch wide, 3 inches long and about 1/32 inch thick.
Glass microscope slide coated with evaporated aluminum.

Ultraviolet light was provided by a 700 watt Hanovia lamp, Model No. 674A which emitted ultraviolet light of wavelength ranging from about 1849 A. to about 13,673 A. Specifically, it emitted ~17 watts of light of wavelength of about 1849 to 2400 A. and ~131 watts of wavelength of 2400 A. to 3360 A. in the ultraviolet. The lamp was provided with a reflector. This lamp was capable of heating the reactor system to about 200° C.

The reactor was a quartz tube which was about 23 cm. long and 3.5 cm. in diameter. The quartz tube was maintained in a horizontal position and the lamp was located about 5 cm. above its central portion. This quartz was transparent to light of wavelength greater than 1800 A.

The reactor was provided with a copper substrate holder which extended along most of the length of the reactor tube and was located substantially centrally therein. The substrates to be coated were placed side by side in the reactor on top of the substrate holder. The substrates were centrally located so that they received the light emitted by the ultraviolet lamp. A small ceramic boat containing about 1 gram of sodium heparin was placed within the quartz tube reactor.

The reactor was evacuated to a substantial vacuum of less than one micron. An electrically powered heating tape was then applied to the quartz reactor to partially vaporize the sodium heparin. The reactor system as well as the sodium heparin source was heated to about 235° C. After about 3 minutes at a temperature of about 235° C., the sodium heparin partially vaporized to raise the vapor pressure within the reactor to about 0.04 torr.

The ultraviolet lamp was then turned on for a period of four hours. During this entire irradiation period, the vapor pressure within the reactor was maintained at about 0.04 torr by maintaining the temperature of the sodium heparin at about 235° C. by means of the heat tape. The lamp was then turned off and the reactor system allowed to cool to room temperature.

All of the substrates were then removed from the reactor. Examination of the substrates showed that a visible pale-brown continuous coating had deposited on the exposed surface of each substrate.

The coated aluminum foil was tested to determine the insulating properties of the coating deposited thereon. The coating on the foil had a capacitance of $26.6 \times 10^{-9}$ farads as determined by a standard bridge technique with a Hg drop electrode of 0.1 cm.$^2$ or counterelectrode in several areas. This indicates that the coating is electrically continuous and imperforate. The dissipation factor of the coating on the foil was measured by standard techniques and was found to be 28 percent at 60 c.p.s. indicating that polar groups are retained in the film. The coating appeared to be substantially uniform and had a thickness of about 150 angstroms assuming a dielectric constant equal to 4. The coating was firmly adherent to the foil and could not be rubbed off manually with a cloth or with one's fingers.

EXAMPLE 2

In this example, the anti-thrombogenic properties of both the coated glass microscope slides prepared in Example 1 were determined and compared to the same type of glass slides which were not treated according to the present invention.

In these tests, a few drops of freshly drawn human venous blood were placed on the surface of each slide. The drops on each slide were stirred periodically at the same time with a fine stainless-steel needle in order to note the time of first fibrin formation and then the time of gross clotting. The results were as follows:

|  | Clotting begins, min. | Major portion clotted, min. |
| --- | --- | --- |
| Uncoated slides (controls): |  |  |
| Glass slide | 6 | 10 |
| Evaporated aluminum coated glass slide | 6 | 10 |
| Coated slides of Example 1: |  |  |
| Glass slide | 10 | 13 |
| Evaporated aluminum coated slide | 17 | 19 |

The table illustrates that the two slides coated in Example 1 are significantly more anti-thrombogenic than the control slides, i.e. the slides not coated according to the present invention. The blood was then wiped off all the slides. The coating on the slides of Example 1 remained continuous and firmly adherent. The above blood clotting test was then repeated and the same results were obtained.

It was also noted that the drops of blood wetted the coated slides of Example 1 much more easily and covered a significantly greater area than on the slides used as controls.

In copending U.S. patent application Ser. No. 20,817 entitled "Anti-Thromogenic Article and Process," filed of even date herewith in the the name of Archibald N. Wright and Hans-Dieter Becker and assigned to the assignee hereof, there is disclosed a process for producing an anti-thrombogenic article by providing a synthetic anti-thrombogenic compound in the form of a vapor in the presence of a substrate, and subjecting the vapor to ultraviolet light to surface photopolymerize it onto the substrate.

What is claimed is:

1. A process for producing an anti-thrombogenic article comprised of a substrate coated with a surface photopolymerized vapor of sodium heparin which comprises providing sodium heparin and a substrate within a substantial vacuum, heating said sodium heparin to produce a vapor of said sodium heparin having a vapor pressure of less than 10 torr, and subjecting said vapor to ultraviolet light ranging in wavelength from about 1800 angstroms to about 4000 angstroms to surface photopolymerize said vapor onto said substrate to produce an adherent continuous anti-thrombogenic coating thereon, said coating retaining a significant portion of the biological properties of said sodium heparin.

2. A process according to claim 1 wherein said substrate is a metal.

3. A process according to claim 1 wherein said substrate is a non-metal.

4. An anti-thrombogenic article comprised of a substrate the surface of which is coated with an adherent continuous thin coating of a surface photopolymerized vapor of sodium heparin.

5. An anti-thrombogenic article according to claim 4 wherein said substrate is a metal.

6. An anti-thrombogenic article according to claim 4 wherein said substrate is a non-metal.

References Cited

UNITED STATES PATENTS 3,453,194   7/1969   Bennett et al. ____ 117—93.31 X
3,508,959   4/1970   Krahnke _____ 3—1

ALFRED L. LEAVITT, Primary Examiner

J. H. NEWSOME, Assistant Examiner

U.S. Cl. X.R.

3—1, DIG. 1, DIG. 3; 117—124 D, 127, 138.8 B; 128—334, 335.5; 424—31